United States Patent Office 3,522,205
Patented July 28, 1970

3,522,205
ETHYLENE SULFIDE POLYMERS STABILIZED WITH POLYAMINE ADDITIVES
Riad H. Gobran, George F. Bulbenko, and Elizabeth A. Peterson, Levittown, Pa., assignors to Thiokol Chemical Corporation, Bristol, Pa., a corporation of Delaware
No Drawing. Continuation-in-part of application Ser. No. 609,280, Jan. 12, 1967, which is a continuation of application Ser. No. 323,074, Nov. 12, 1963. This application Apr. 9, 1968, Ser. No. 719,839
Int. Cl. C08g 51/60
U.S. Cl. 260—45.9    14 Claims

ABSTRACT OF THE DISCLOSURE

Ethylene sulfide polymers are stabilized against degradation during high temperature molding by the use of certain polyamines and modified polyamines as thermal stabilizers.

CROSS-REFERENCES TO RELATED APPLICATIONS

This application is a continuation-in-part of application Ser. No. 609,280, filed Jan. 12, 1967 which is a continuation application of Ser. No. 323,074, filed Nov. 12, 1963, both of which are now abandoned.

BACKGROUND OF THE INVENTION

Recent advances in the polymer field have provided solvent resistant poly(ethylene sulfide) polymers of high molecular weight for use as high temperature injection and extrusion molding materials. Because of their very good solvent resistance and high temperature melting properties, these polymers can be molded into a variety of useful objects such as, pipe, film, filament, rods, bars, gears, pumps, valves, etc. The vigorous molding conditions, i.e., time and temperature, usually employed when molding such materials, however, can lead to some degradation of the polymer being molded as evidenced by changes in the color of, and/or emission of odors from, and/or the lowering of the melting point and/or melt index of these materials. Such degradation, if allowed to go unchecked, would cause processing difficulties during molding and would seriously lessen the value of the molded end products produced from these polymers. The use of conventional phenolic, phosphite, aromatic, amine or thiodipropionate antioxidants is of negligible value in preventing this degradation during molding at elevated temperatures.

SUMMARY OF THE INVENTION

It has now been found, according to the present invention that high molecular weight, moldable poly(ethylene sulfide) polymers can be protected against degradation during high temperature molding operations conducted therewith if there is added to the polymer about 0.05 to 5 and preferably about 1% by weight of the polymer being molded of one or more polyamines or modified polyamines. The object of the present invention, therefore is to provide thermal stabilizers which will protect high molecular weight poly(ethylene sulfide) polymers against degradation during high temperature molding operations.

DESCRIPTION OF THE PREFERRED EMBODIMENTS

Polyfunctional amines which may be used according to the present invention include compounds having the structure A—(RNH)$_n$A' in which A and A' may be

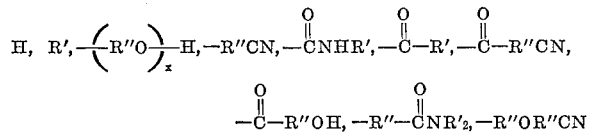

or

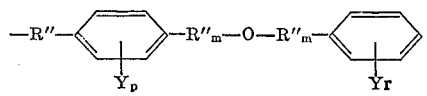

In the foregoing formulas:

R=alkylene
R'=alkyl, cycloalkyl, aryl, alkaryl or aralkyl
R''=alkylene, arylene, alkarylene or aralkylene
Y=H, —CH$_2$OH, —R—(NHR)$_n$NH—A, alkyl, cycloalkyl, aryl, alkaryl or aralkyl
$n=1$ or more
$x=1$ to 25
$p=0$ to 4
$r=0$ to 5
$m=0$ or 1

In cases where the foregoing symbols appear more than once in a given formula, they may represent the same or different groups. A limiting value for $x$ has been given because as the length of the polyether chain increases, the activity of the amine portion, which is believed to be the more active portion for stabilizing purposes, tends to diminish. However, no such limiting value has been given to the subscript $n$, since, regardless of the length of the polyamine chain, there does not appear to be any lessening of the activity of the amine function for stabilizing purposes. Examples of such compounds are polyalkylene polyamines, such as, diethylene triamine, triethylene tetramine, tetraethylene pentamine, pentaethylene hexamine, dipropylene triamine, tripropylene tetraamine, tetrapropylene pentaamine, diisopropylene triamine, triisopropylene tetraamine, dibutylene triamine, tributylene tetraamines, tetrabutylene pentamine; N-(β-hydroxyethyl)-diethylene triamine; N,N'-bis(2-aminoethyl)4,4' - oxydibenzylamine; poly(alkylene imines), such as poly(ethyleneimine); adducts of alkylene oxides and polyalkylene polyamines such as an adduct of ethylene oxide or propylene oxide and tetraethylene pentamine, diethylene triamine or dipropylene triamine; adducts of polymerized alkylene imines and alkylene or aryl oxides such as adducts of polymerized ethylene imine or ethylenediamine and styrene oxide; adducts of polyalkylene polyamines and alkylene nitriles, such as, adducts of ethylenediamine or diethylene triamine and acrylonitrile; adducts of polyalkylene polyamines and alkyl halides, such as, adducts of tetraethylene pentamine and n-octyl chloride; adducts of polyalkylene polyamines and alkyl or aryl isocyanates, such as adducts of tetraethylenepentamine and phenyl or ethyl isocyanate alkylene diureas such as 1,1'-ethylenediurea; adducts of alkyleneamides and polyalkylene polyamines, such as, an adduct of ethylenediamine and acrylamide. By "adduct" it is meant a reaction product.

To be practically useful, the stabilizer should be as uniformly dispersed as possible throughout the polymer mass being molded. The stabilizers should be solid or liquid, high boiling materials that will remain in a substantially nonvolatile state when used in combination with the poly(ethylene sulfide) in the range of the molding temperatures being employed, i.e., usually about 215–270° C. or more. For this reason the stabilizers of the present invention should preferably have boiling points of about at least 200° C.

The solid, high molecular weight moldable ethylene sulfide polymers which may be treated with the stabilizers according to the present invention may be homopolymers or they may be interpolymers which contain a major portion of ethylene sulfide and a minor portion of one or more interpolymerizable vicinal episulfide monomers such as styrene sulfide and alkylene sulfides such as propylene sulfide, 1,2-butylene sulfide, 2,3-butylene sulfide, isobutylene sulfide and cyclohexene sulfide. Polymers of this type and their preparation are described in U.S. Pat. 3,365,431.

The polymers produced as described in this patent are fine particle sized, fluffy powders. Moldable homopolymers and interpolymers of a more granular nature and which have better handling properties may be produced using a "seed catalyst" technique as described in co-pending application S.N. 484,749, filed Sept. 2, 1965, now U.S. Pat. No. 3,402,154, in the name of Roy Larsen. These granular powders may also be stabilized with the stabilizers of the present invention. In the "seed catalyst" procedure the zinc diethyl/$H_2O$ (in about a 1:1 mol ratio) catalyst is used to polymerize the episulfide monomer charge in solution at room temperature. About 0.64 mol percent catalyst is used based on the monomer charge. The solvents used are those such as tetrahydrofuran, petroleum ether, benzene and toluene. At temperatures of about 78±2° F. the polymerization only proceeds to about a 10–20% conversion and the polymer product contains, combined therewith, all the catalyst initially charged. The fluffy polymer product is then isolated and dried. This product is then compacted to form dense cakes and the cakes are then ground to form particles of less than 20 mesh in size. This granulated polymer product which contains the original catalyst charge, in the form, it is believed, of an activated zinc oxide, is then used as a "seed catalyst" with which to polyermize ethylene sulfide alone or with other monomers to form granular powders. About 1 to 2% by weight of the seed catalyst is used based on the monomer charge. The seed catalyst based polymerization is conducted at elevated temperatures of about 176±5° F. for about one to three hours. The yields of granular polymer obtained are about 80–100%. The seed catalyst polymer and the polymer produced therewith have essentially the same chemical characteristics and they are used in combination in subsequent molding operations without separating one from the other.

The following examples are merely illustrative of the present invention and are not intended as a limitation upon the scope thereof.

EXAMPLE 1

Preparation of ethylene sulfide polymer (A) Preparation of seed catalyst: Under a nitrogen atmosphere the following reactants were added, in the order presented, into a 2½ gallon solution bottle: 2835 ml. of tetrahydrofuran and sufficient diethyl zinc to effect a 1:1 mol ratio with 9.838 ml. of water added subsequent to the diethyl zinc. The materials were agitated by sparging with nitrogen. Into a second vessel, a clean dry reactor, purged with nitrogen, 51.9 pounds of petroleum ether was added and then charged with 6.49 pounds of ethylene sulfide. The temperature of the reactor was then adjusted to 78±2° F. and the entire above prepared solution of tetrahydrofuran, diethyl zinc and water added. The reactor was then agitated for one hour at the above temperature. The polymer thus produced was centrifuged out and subsequently dried for 3 hours at 160 to 180° F. under reduced pressure. The dried polymer was then compacted and pulverized to pass through a #40 screen. A yield of 1.3 pounds of seed catalyst polymer was thereby obtained.

(B) Preparation of the polymer: A suitable sized reactor was purged with nitrogen for 15 minutes and charged with 120 pounds of petroleum ether and 60.1 pounds of ethylene sulfide in the order presented. An additional 50 pounds of petroleum ether was then charged into the reactor to completely flush the ethylene sulfide from the charging lines into the reactor. The seed catalyst, prepared in (A) above, was then charged into the reactor, the nitrogen shut off, the reactor sealed and the temperature raised to 176±5° F. in 1½ hours. The reaction was continued at this temperature for two additional hours. The polymerized mass and solvent was then cooled to less than 100° F., separated by centrifuging and dried under reduced pressure for 4 hours at about 190° F. A yield of about 80% was obtained.

EXAMPLE 2

Melt index studies were used to illustrate the use of various polyamines and modified polyamines of the present invention as stabilizers in combination with poly(ethylene sulfide) polymer prepared as in Example 1.

The melt index data shown in the accompanying examples compares the results obtained using unstabilized poly(ethylene sulfide) and the same poly(ethylene sulfide) stabilized with one of several of the polyamines and modified polyamines of the present invention under simulated high temperature molding conditions. The melt index may be defined as an empirical measure of the flow properties of a polymer which in turn is indicative of its molecular weight. Generally, degradation of a polymeric material results in the production of relatively low molecular weight products. Thus, the melt index can also be used as a measure of polymer degradation.

Using a Waring Blendor, each stabilizer, at the concentration level indicated in the examples was intimately mixed with a separate portion of the poly(ethylene sulfide) polymer for about 10 minutes to effect a uniform powdery blend. Each blend was then tested for melt index properties using a capillary flow plastometer, as specified in ASTM Method D1238–57T and as sold by F. F. Slocomb Corporation of Wilmington, Del. The reservoir of the instrument was preheated and maintained at the temperature indicated in the examples. This reservoir was then charged with about 4 grams of sample within a two minute interval. A 5 kilogram weight was then placed on top of the charge by means of a ram and allowed to remain there for 2 minutes after which time interval it was replaced with a 2.160 kilogram weight. After 15 seconds the plug was removed from the flow orifice and the amount of sample which flowed through the orifice in each minute interval thereafter was separately collected and accurately weighed to the nearest milligram. A control sample of poly(ethylene sulfide) which contained no stabilizer was tested at each of the simulated test temperatures as above to gain comparative data.

The data obtained was interpreted by calculating and comparing the following values:

(1) The flow rate of the extrudate in grams/minute at the 8th minute interval of flow through the orifice of the test instrument. This value is an index of over-all behavior, since it is dependent on initial molecular weight and the early rate of degradation of the polymer.

(2) The rate of degradation at the 8th minute interval is also presented as the slope of the melt index curve for the 8th minute interval. This value illustrates the acceleration of the flow in grams/minute$^2$ or the rate at which the flow rate is changing.

(3) The rate of degradation in grams/minute$^2$ one minute before the sample is completely extruded through the orifice. The extrusion time interval, in minutes, at which this takes place is also presented. This rate of degradation value is indicative of what is happening just before the testing is completed.

When tested as described above at temperatures of both 225° and 235° C. the unstabilized polymer charge was completely extruded before 8 minutes. At 225° C., the polymer charge was completely extruded in about six minutes and the slope of the melt index curve at the five minute extrusion interval was 37.7 grams/minute$^2 \times 10^{-2}$ at 235° C., the unstabilized polymer charge was completely extruded in about four minutes and the slope of the melt index curve at the three minute extrusion interval was 76 grams/minute$^2 \times 10^{-2}$.

As can be seen from a study of the data shown in the table below most of the stabilizers tested were able to stabilize the polymer to such an extent that the polymer was not extruded through the orifice of the test instrument in less than eight minutes at the test temperature and thus it was possible to get a Flow Rate and a Slope for the melt index curve for these systems at one minute before the complete extrusion of the sample. These data indicate that the stabilizers used in Examples 15, 19, 20 and 24 stabilized the polymer at 235° C. to such an extent that the stabilized system was not completely extruded in four minutes and the 8th minute test interval i.e., using the stabilizers in Examples 15, 19, 20, 22 and 24 in the table below. It was possible, however, to plot the scope of the melt index curve for the stabilized system used in Example 22, which was extruded in about four minutes, is less than the slope of the melt index curve for the unstabilized polymer, indicating that the stabilizer used did exert a stabilizing effect on the polymer at the test temperature. All five of these stabilizers, i.e., those used in Examples 15, 19, 20, 22 and 24, would have an even more pronounced stabilizing effect at lower temperatures.

At the higher extrusion test temperature of 235° C. some of the stabilized systems were extruded in less than eight minutes and thus it was not possible to obtain data at the 8th minute test interval i.e., using the stabilizers

TABLE I

| Example | Polyamine Additive and Structure | Conc. In Percent By Weight | Test Temp., °C. | Flow Rate In Grams/Min. at 8th Minute Interval | Slope at 8th Minute in Grams/Min.$^2 \times 10^2$ | Slope at 1 Minute Before Complete Extrusion in Grams/Min.$^2 \times 10^2$ |
|---|---|---|---|---|---|---|
| 1 | Triethylene tetramine: $H_2N(C_2H_4NH)_2C_2H_4NH_2$ | 1 | 225 | 0.08 | 2.0 | 5.5 at 19 Minutes. |
| 2 | Tetraethylene Pentamine: $H_2N(C_2H_4NH)_3C_2H_4NH_2$ | 1 | 225 | 0.03 | 0.5 | 14.6 at 25 Minutes. |
| 3 | N-(β-Hydroxyethyl)-diethylene triamine: $HOC_2H_4NHC_2H_4NHC_2H_4NH_2$ | 2 | 225 | 0.01 | 0 | 2.8 at 43 Minutes. |
| 4 | Ethylene Oxide (1)+Tetraethylene pentamine (TEP) (2) Adduct Mol Ratio of (1) to (2)=1.01: $HOC_2H_4NH(C_2H_4NH)_3C_2H_4NH_2$ | 1 | 225 | 0.01 | 0.1 | 15.3 at 40 Minutes. |
| 5 | Same as No. 4, Mol Ratio of (1) to (2)=1.94: $HOC_2H_4NH(C_2H_4NH)_4C_2H_4OH$ | 1 | 225 | 0.02 | 0.4 | 1.0 at 33 Minutes. |
| 6 | Same as No. 4, Mol Ratio of (1) to (2)=2.96: $HOC_2H_4O(C_2H_4NH)_5C_2H_4OH$ | 1 | 225 | 0.04 | 0.5 | 2.4 at 23 Minutes. |
| 7 | Same as No. 4, Mol Ratio of (1) to (2)=3.99: $HOC_2H_4(OC_2H_4)_2NH(C_2H_4NH)_4C_2H_4OH$ | 1 | 225 | 0.03 | 0.4 | 1.2 at 27 Minutes. |
| 8 | Polymerized ethylene imine+5% Styrene Oxide: $HO-CHCH_2(NHC_2H_4)_7NH_2$  | 1 | 225 | 0.06 | 0.0 | 5.9 at 21 Minutes. |
| 9 | Adduct of Ethylene diamine+Styrene Oxide: $HO-CH-CH_2NHC_2H_4NHCH_2-CH-OH$ 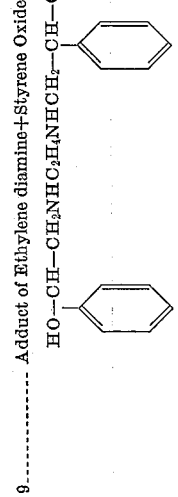 | 1 | 235 | 0.51 | 13.5 | 13.0 at 10 Minutes. |

TABLE I.—Continued

| Example | Polyamine Additive and Structure | Conc. In Percent By Weight | Test Temp., °C. | Flow Rate In Grams/Min. at 8th Minute Interval | Slope at 8th Minute in Grams/Min.²×10³ | Slope at 1 Minute Before Complete Extrusion in Grams/Min.²×10³ |
|---|---|---|---|---|---|---|
| 10 | Adduct of Ethylene diamine+Acrylonitrile:<br>NCC₂H₄NHC₂H₄NHC₂H₄CN | 1 | 225 | 0.01 | ~0 | ~0 at 68 Minutes. |
| 11 | Adduct of Diethylenetriamine+Acrylonitrile:<br>NCC₂H₄NH(C₂H₄NH)₂C₂H₄CN | 1 | 235 | 0.01 | ~0 | 6.6 at 37 Minutes. |
| 12 | Adduct of Tetraethylene pentamine+Acrylonitrile:<br>NCC₂H₄NH(C₂H₄NH)₄C₂H₄CN | 1 | 225 | 0.01 | ~0 | 0 at 35 Minutes. |
| 13 | Adduct of Diethylenetriamine+Methacrylonitrile:<br>NCCH—CH₂NH(C₂H₄NH)₂CH₂CH—CN<br>    \|                                    \|<br>   CH₃                                 CH₃ | 1 | 235 | 0.01 | ~0 | 60 at 28 Minutes. |
| 14 | Adduct of Tetraethylene Pentamine and n-Octyl Chloride:<br>CH₃(CH₂)₇NH(C₂H₄NH)₄(CH₂)₇CH₃ | 1 | 235 | 0.63 | 12.3 | 12.3 at 9 Minutes. |
| 15 | N,N'-dibenzylethylene-diamine:<br>CH₂NHC₂H₄NHCH₂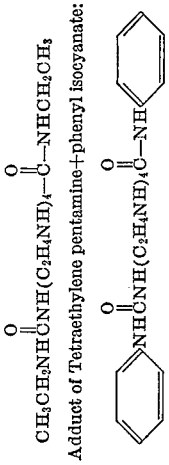 | 1 | 235 | (¹) | (¹) | 35.0 at 6 Minutes. |
| 16 | Adduct of Tetraethylene pentamine+ethyl isocyanate:<br>           O<br>           ‖<br>CH₃CH₂NHCNH(C₂H₄NH)₄—C—NHCH₂CH₃ | 1 | 235 | 0.05 | ~0 | ~200 at 15 Minutes. |
| 17 | Adduct of Tetraethylene pentamine+phenyl isocyanate:<br>        O<br>        ‖<br>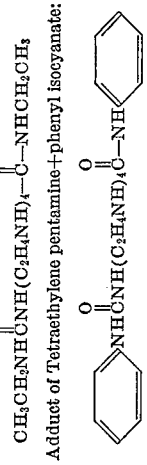NHCNH(C₂H₄NH)₄C—NH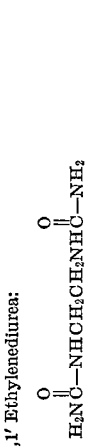 | 1 | 235 | 0.56 | 22.9 | 23.9 at 9 Minutes. |
| 18 | 1,1' Ethylenedurea:<br>     O                O<br>     ‖                ‖<br>H₂NC—NHCH₂CH₂NHC—NH₂ | 1 | 235 | 0.74 | 36 | 36 at 8 Minutes. |
| 19 | Dipropionylamide of Ethylene Diamine:<br>         O                O<br>         ‖                ‖<br>CH₃CH₂CNHCH₂CH₂NHCCH₂CH₃ | 1 | 235 | (¹) | (¹) | 68 at 5 Minutes. |

TABLE I.—Continued

| Example | Polyamine Additive and Structure | Conc. In Percent By Weight | Test Temp., °C. | Flow Rate In Grams/Min. at 8th Minute Interval | Slope at 8th Minute in Grams/ Min.²×10² | Slope at 1 Minute Before Complete Extrusion in Grams/Min.²×10² |
|---|---|---|---|---|---|---|
| 20 | Adduct of Ethylenediamine+Benzoyl Chloride:<br>$\phantom{x}$<br>$\bigcirc\!\!-\!\!\overset{O}{\underset{\|}{C}}\!\!-\!\!NH\!\!-\!\!CH_2CH_2NH\bigcirc$ | 1 | 235 | (¹) | (¹) | 31 at 6 Minutes. |
| 21 | Adduct of Tetraethylene Pentamine+Benzoyl Chloride:<br>$\bigcirc\!\!-\!\!\overset{O}{\underset{\|}{C}}\!\!-\!\!NH(CH_2CH_2NH)_3\!\!-\!\!CH_2CH_2NH\bigcirc$ | 1 | 235 | 0.67 | 22.0 | 39 at 9 Minutes. |
| 22 | Adduct of Tetraethylene Pentamine+2-ethyl butyryl chloride:<br>$CH_3CH_2$<br>$\phantom{xx}\diagdown$<br>$\phantom{xxx}CHC\!-\!NH(C_2H_4NH)_3\!-\!CH_2CH_2NH\overset{O}{\underset{\|}{C}}\!-\!CH$<br>$\phantom{xx}\diagup\phantom{xxxxxxxxxxxxxxxxxxxxxxx}\diagdown$<br>$CH_3CH_2\phantom{xxxxxxxxxxxxxxxxxxxxx}CH_2CH_3$ | 1 | 235 | (¹) | (¹) | 24.5 at 3 Minutes. |
| 23 | $\left(HO\!-\!\!\bigcirc\!\!\right)_{\!2}\!\!\overset{O}{\underset{\|}{C}}\!-\!CH_2CH_2\!-\!\overset{O}{\underset{\|}{C}}\!-\!NH\!-\!(CH_2CH_2NH)_4\!-\!\overset{O}{\underset{\|}{C}}\!-\!CH_2CH_2\!-\!\overset{CH_3}{\underset{\underset{CH_3}{\|}}{C}}\!\!-\!\!\left(\bigcirc\!\!-\!OH\right)_{\!2}$ | 1 | 235 | 0.09 | 1.0 | 2.6 at 20 Minutes |
| 24 | Dicyanoacetylethylene diamine:<br>$NC\!-\!CH_2\overset{O}{\underset{\|}{C}}\!-\!NHCH_2CH_2NH\overset{O}{\underset{\|}{C}}CH_2CN$ | 1 | 235 | (¹) | (¹) | 58 at 6 Minutes. |
| 25 | Adduct of Ethylenediamine+Acrylamide:<br>$\phantom{x}$<br>$H_2N\overset{O}{\underset{\|}{C}}\!-\!CH_2CH_2NHCH_2CH_2NHCH_2CH_2\overset{O}{\underset{\|}{C}}NH_2$ | 1 | 235 | 0.03 | 0.4 | 10 at 32 Minutes. |
| 26 | Adduct of Ethylenediamine+N,N'diethylacrylamide:<br>$CH_3CH_2\phantom{xxxxxxxxxxxxxxxxxxxxxxxx}CH_2CH_3$<br>$\phantom{xx}\diagdown\phantom{xxxxxxxxxxxxxxxxxxxxxxxx}\diagup$<br>$\phantom{xxxx}N\overset{O}{\underset{\|}{C}}\!-\!CH_2CH_2NHCH_2CH_2NHCH_2CH_2\overset{O}{\underset{\|}{C}}\!-\!N$<br>$\phantom{xx}\diagup\phantom{xxxxxxxxxxxxxxxxxxxxxxxx}\diagdown$<br>$CH_3CH_2\phantom{xxxxxxxxxxxxxxxxxxxxxxxx}CH_2CH_3$ | 1 | 235 | 0.55 | 19.0 | 23 at 9 Minutes. |

¹ Indicates that the sample was completely extruded through the orifice of the test apparatus before the 8th minute interval.

EXAMPLE 27

An ethylene sulfide polymer was prepared as described in Example 1. A portion of this polymer was stabilized by incorporating therein 1% by weight of N,N'-bis(2-aminoethyl)-4,4'-oxy-dibenzylamine (sold under the trade name Dowamine F). The effectiveness of this stabilizer was determined by measuring and comparing the melt indices of stabilized and unstabilized samples of the polymer. The melt indices were determined as described in connection with Examples 1 to 26 using 4 gram samples. The results are given in Table II.

TABLE II

| Sample | Temp., °C. | Flow Rate in Grams/Min. at 8th Minute Interval | Slope at 8th Minute in Grams/Min.²×10² | Slope at 1 Minute Before Complete Extrusion in Grams/Min.²×10² |
|---|---|---|---|---|
| Unstabilized Polymer (Control) | 225 | 1.01 | 30 | 40 at 9 Minutes. |
| Stabilized Polymer | 225 | 0.053 | 2 | About 0 at 63 Minutes. |
| Stabilized Polymer | 235 | 0.038 | 4 | 4 at 39 Minutes. |

The data of the foregoing table show the exceptional effectiveness of N,N'-bis(2-aminoethyl)4,4'-oxy-dibenzylamine as a stabilizer for ethylene sulfide polymers.

We claim:

1. A composition of matter comprising moldable ethylene sulfide polymer, and, as a thermal stabilizer, stabilizing quantities of at least one compound having the structure A—NH(RNH)ₙA' in which R is an alkylene group; n is a whole number of at least 1; and A and A' are selected from the group consisting of

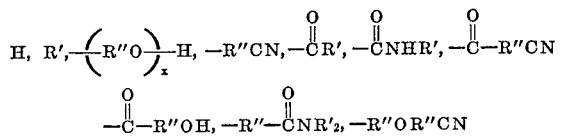

and

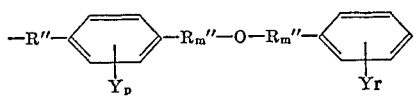

in which R' is selected from the group consisting of alkyl, cycloalkyl, aryl, alkaryl and aralkyl; R" is selected from the group consisting of alkylene, arylene, alkarylene or aralkylene; Y is selected from the group consisting of H, —CH₂OH, —R"(NHR)ₙNH—A, alkyl, cycloalkyl, aryl, alkaryl or aralkyl; $x$ is a whole number from 1 to 25; $m$ is 0 or 1; $p$ is an integer from 0 to 4; and $r$ is an integer from 0 to 6; with the proviso that where any symbols appear more than once, they may represent the same or different groups.

2. A composition of matter as in claim 1 in which R is CH₂—CH₂.
3. A composition of matter as in claim 1 in which A and A' are H.
4. A composition of matter as in claim 1 in which A is H and A' is (R"O)ₓH.
5. A composition of matter as in claim 1 in which A and A' are (R"O)ₓH.
6. A composition of matter as in claim 1 in which A and A' are —R"CN.
7. A composition of matter as in claim 1 in which A and A' are R'.
8. A composition of matter as in claim 1 in which A and A' are

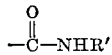

9. A composition of matter as in claim 1 in which A and A' are

10. A composition of matter as in claim 1 in which A and A' are

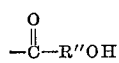

11. A composition of matter as in claim 1 in which A and A' are

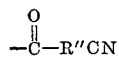

12. A composition of matter as in claim 1 in which A and A' are

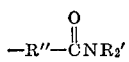

13. A composition of matter as in claim 1 in which A is H, A' is

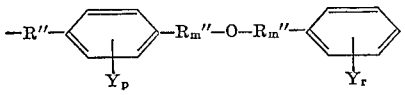

and Y is —R"(NHR)ₙNH—A.

14. A composition of matter as in claim 1 wherein the stabilizer has the structure

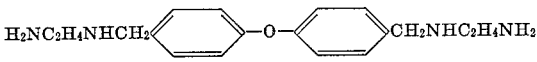

References Cited

UNITED STATES PATENTS

| 2,878,232 | 3/1959 | Schweitzer | 260—45.9 XR |
| 3,000,865 | 9/1961 | Gurgiolo | 260—79 |
| 3,222,326 | 12/1965 | Brodoway | 260—79.7 |

DONALD E. CZAJA, Primary Examiner

M. J. WELSH, Assistant Examiner